(12) United States Patent
Akopian et al.

(10) Patent No.: US 6,833,813 B2
(45) Date of Patent: Dec. 21, 2004

(54) METHOD, RECEIVER AND SYSTEM FOR DETERMINING THE TIME OF RECEPTION OF A BEACON SIGNAL

(75) Inventors: David Akopian, Tampere (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/403,801

(22) Filed: Mar. 28, 2003

(65) Prior Publication Data

US 2003/0234740 A1 Dec. 25, 2003

(30) Foreign Application Priority Data

Mar. 28, 2002 (WO) ................................. PCT/IB02/00986

(51) Int. Cl.⁷ ................................................. G01S 1/00
(52) U.S. Cl. ...................... 342/385; 342/386; 342/457; 342/378; 342/357.06; 342/357.16
(58) Field of Search ................................. 342/385, 386, 342/457, 378, 357.06, 357.16

(56) References Cited

U.S. PATENT DOCUMENTS 5,526,357 A * 6/1996 Jandrell ...................... 370/346
6,121,923 A 9/2000 King ....................... 342/357.12
2002/0033767 A1 3/2002 Krasner ................. 342/357.06

FOREIGN PATENT DOCUMENTS

EP 1115008 7/2000

\* cited by examiner

*Primary Examiner*—Theodore M. Blum
(74) *Attorney, Agent, or Firm*—Ware, Fressola, Van Der Sluys & Adolphson LLP

(57) ABSTRACT

The invention relates to a method and to devices for determining in a positioning system the time of reception of a beacon signal which was received and tracked by a receiver. In order to enable a re-acquisition of the system time based on a noisy received signal, it is proposed that the method comprises as a first step reconstructing a beacon signal for an interval based on available information. Then, a cross-correlation is performed between the reconstructed signal and the received signal at different relative positions to each other. Next, the time of transmission of the received signal is determined based on information for the reconstructed signal and on the relative position resulting in the maximum correlation value. Finally, a time of reception of said received signal is determined as the sum of the determined time of transmission of the received signal and of a calculated time of flight of the received signal.

17 Claims, 7 Drawing Sheets

METHOD, RECEIVER AND SYSTEM FOR DETERMINING THE TIME OF RECEPTION OF A BEACON SIGNAL

CROSS-REFERENCE TO RELATED APPLICATION

This application claims priority under 35 USC 119 to International Application PCT/IB02/00986, filed Mar. 28, 2002.

FIELD OF THE INVENTION

The invention relates to a method for determining in a positioning system the time of reception of a beacon signal received by a receiver receiving and tracking signals from at least one beacon, wherein signals from this beacon have a component of a known regularity. The invention relates equally to a corresponding receiver and to a positioning system comprising a receiver.

BACKGROUND OF THE INVENTION

A well known positioning system which is based on the evaluation of signals transmitted by beacons is GPS (Global Positioning System). The constellation in GPS consists of more than 20 satellites employed as beacons that orbit the earth.

Each of the satellites, which are also called space vehicles (SV), transmits two microwave carrier signals. One of these carrier signals L1 is employed for carrying a navigation message and code signals of a standard positioning service (SPS). The L1 carrier phase is modulated by each satellite with a different C/A (Coarse Acquisition) Code. Thus, different channels are obtained for the transmission by the different satellites. The C/A code, which is spreading the spectrum over a 1 MHz bandwidth, is repeated every 1023 bits, the epoch of the code being 1 ms. The carrier frequency of the L1 signal is further modulated with navigation information at a bit rate of 50 bit/s, which information comprises in particular ephemeris and almanac data. Ephemeris parameters describe short sections of the orbit of the respective satellite. Based on these ephemeris parameters, an algorithm can estimate the position of the satellite for any time while the satellite is in the respective described section. The orbits calculated using ephemeris parameters are quite accurate, but the ephemeris parameters are only valid for a short time, i.e. for about 2–4 hours. The almanac data contain in addition coarse orbit parameters. The orbits calculated based on almanac data are not as accurate as the orbits calculated based on ephemeris data, but their validity time is longer than one week. Almanac and ephemeris data also comprise clock correction parameters which indicate the current deviation of the satellite clock versus a general GPS time.

Further, a time-of-week TOW count is reported every six seconds as another part of the navigation message.

A GPS receiver of which the position is to be determined receives the signals transmitted by the currently available satellites, and a tracking unit of the receiver detects and tracks the channels used by different satellites based on the different comprised C/A codes. The receiver first determines the time of transmission TOT of the code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits.

Based on the time of transmission and the measured time of arrival TOA of the signal at the receiver, the time of flight TOF required by the signal to propagate from the satellite to the receiver is determined. By multiplying this TOF with the speed of light, it is converted to the distance between the receiver and the respective satellite. The computed distance between a specific satellite and a receiver is called pseudo-range, because the GPS system time is not accurately known in the receiver. Usually, the receiver calculates the accurate time of arrival of a signal based on some initial estimate, and the more accurate the initial time estimate is, the more efficient are position and accurate time calculations. A reference GPS time can, but does not have to be provided to the receiver by a network.

The computed distances and the estimated positions of the satellites then permit a calculation of the current position of the receiver, since the receiver is located at an intersection of the pseudo-ranges from a set of satellites. In order to be able to compute a position of a receiver in three dimensions and the time offset in the receiver clock, the signals from four different GPS satellite signals are required.

If navigation data are available on one of the receiver channels, the indication of the time of transmission comprised in a received signal can also be used in a time initialization for correcting a clock error in the receiver. In GPS, an initial time estimate is needed for the positioning. For the initial time estimate, the average propagation time of satellite signal of around 0.078 seconds is added to the time of transmission extracted from the navigation information. The result is used as initial estimate of the time of arrival of a signal, which estimate lies within around 20 ms of the accurate time of arrival. The receiver then determines for different satellites the time at which a respective signal left the satellite. Using the initial estimate of the current time, the receiver forms pseudorange measurements as the time interval during which the respective signal was propagating from the satellite to the receiver either in seconds or in meters by scaling with the speed of light. After the position of the receiver has been calculated from the determined pseudoranges, the accurate time of reception can then be calculated from standard GPS equations with an accuracy of 1 µs.

However, in order to be able to make use of this time initialization, the navigation data from a satellite signal is needed. Currently, most of the GPS receivers are designed for outdoor operations with good signal levels from satellites. Thus, only good propagation conditions ensure that the navigation data required for the described time initialization is available.

In bad propagation conditions, in contrast, it may not be possible to extract the navigation message accurately enough from received satellite signals, since a high bit-error rate and weak signal levels make a robust decoding of navigation bits impossible. Such bad propagation conditions, which are often given indoors, render the time initialization and the pseudorange measurements more difficult.

For those cases, in which the standard time initialization methods can not be applied since the navigation data are noisy, the time initialization process for the receiver can be performed by a time recovery method. Some known time recovery methods are based on the cross-correlation of the tracked signal and an expected signal to define the time of transmission, as will be explained in the following.

Even in bad propagation conditions, the receiver is often still able to track the signal of a GPS satellite and to provide raw data without an evaluation of the contained bit values. On the other hand, the navigation message containing ephemeris and/or almanac data may be extractable from satellite signals received by a base station of a mobile communications network.

The raw satellite signal is received at the receiver from the sky and the receiving time of the data is read from a time counter of the receiver. If the receiver is part of a mobile station or connected to a mobile station, the raw data can then be sent from the mobile receiver to a mobile communication network. In the network, the raw data is cross-correlated with corresponding data received by an Location Measurement Unit (LMU), which is a GPS receiver located in the network. The time of transmission of the tracked signal can then be estimated based on the navigation data in the signal received by the network which results in the highest correlation. An initial estimate for the time of reception is the LMU time of reception of the same fragment. The LMU sends the determined time estimate to the mobile receiver. After the position of the receiver has been calculated from the determined pseudoranges to at least four GPS satellites, the accurate time of reception can now be calculated from standard GPS equations with an accuracy of 1 $\mu$s.

It is a disadvantage of this approach that the computing for the time initialization has to be carried out in a network. It also requires additional signaling between the mobile receiver and the network.

SUMMARY OF THE INVENTION

It is an object of the invention to provide a possibility of determining a quite accurate time of reception of a beacon signal received by a receiver receiving and tracking signals from at least one beacon. It is in particular an object of the invention to provide such a possibility for the case that a comprised indication of the time of transmission of the signal cannot be extracted from the signal. It is further an object of the invention to enable a determination of a quite accurate time of reception that can be based on the signals from a single beacon. It is moreover an object of the invention to enable a determination of a quite accurate time of reception that can also be realized independently of a mobile communication network, e.g. in the receiver itself.

These objects are reached according to the invention with a method for determining in a positioning system the time of reception of a signal transmitted by a beacon and received by a receiver receiving and tracking signals at least from this beacon. It is assumed for the proposed method that the signals from the beacon have a component of a known regularity, like a GPS signal. In a first step of the proposed method, a beacon signal is reconstructed for an interval based on available information on signals from the beacon, e.g. ephemeris and/or almanac data, which are valid for this interval. In a second step, a cross-correlation is performed between the respectively overlapping parts of the reconstructed beacon signal and the received beacon signal at different relative positions to each other. It is to be noted that in case the received signal and the reconstructed signal have a different sampling rate, this difference has to be taken into account for the cross-correlation.

In a third step, the time of transmission of the received beacon signal is determined based on information for the reconstructed signal and on the relative position resulting in the maximum correlation value between the reconstructed signal and the received signal. In a last step of the proposed method, a time of reception of the received beacon signal is determined as the sum of said determined time of transmission of the received beacon signal and of a calculated time of flight of the received beacon signal.

It is to be noted that in addition the correlation values closest to the maximum correlation value might be considered for determining the time of transmission of the received beacon signal, in particular in case there is no clear maximum value.

The objects of the invention are also reached with a receiver comprising means for receiving and tracking signals from at least one beacon and processing means for realizing the proposed method.

The objects of the invention are further reached with a positioning system comprising a receiver and at least one network element of a network. This network may be a mobile communication network or any other network. The receiver comprises again means for receiving and tracking signals from at least one beacon and processing means for realizing the steps of the proposed method. In addition, the receiver comprises means for communicating with the network.

Finally, the objects of the invention are reached according to the invention with a positioning system, in which the steps of the proposed method are realized by a processing unit of the system which is external to a receiver of the system. The receiver includes in this case means for receiving and tracking signals from at least one beacon and means for providing received and tracked beacon signals to the processing unit. The processing unit can also include other functions. It can be given e.g. by a mobile station to which the receiver is connected and which is able to communicate with a mobile communication network for receiving pieces of information. It can also be given by a network element of a network, in which required pieces of information are available.

The invention proceeds from the idea that it is possible to reconstruct a beacon signal expected in a specific interval, proceeding from information available for this interval for signals from the beacon in question. A GPS signal comprising navigation data can be built for example for a desired period of time using available ephemeris and/or almanac data. A reconstructed beacon signal can then be cross-correlated with the raw data of a received signal, which raw data might be so noisy that the comprised information can not be extracted correctly. The cross-correlation reveals the best match between the received signal and the reconstructed signal in different shifting positions. Due to the regularity of the beacon signals, the interval does not have to coincide with the time of the received signal in question in order to enable a good match, but only with a corresponding signal with respect to the regularity. The time of transmission of the received signal can be determined based on information available for the part of the reconstructed signal resulting in the best match, e.g. the bit address of the last bit in this part of the reconstructed signal. The desired time of reception of the received signal is then given by the sum of the time of transmission and the time of flight required by the signal to propagate from the beacon to the receiver.

It is thus an advantage of the invention that it enables an estimation of the time of reception of a beacon signal with a high accuracy in a situation in which information comprised in a received beacon signal is not extractable. It is moreover an advantage of the invention that the time of reception can be determined based on the estimated correct time of transmission of a single beacon, while the GPS equations employed by conventional methods require to this end the time of transmission of signals of at least four GPS satellites. It is equally an advantage of the invention that the time of reception can be determined outside of a network, if desired. Still, a microcontroller unit (MCU) of a network can assist the baseband of the receiver for a fast re-acquisition of the system time.

It is to be noted that in case ephemeris, almanac and other components of a navigation message are available at the processing means, e.g. from a network, it is usually possible to reconstruct the signal completely. However, if only ephemeris is available, or only almanac, then a reconstruction can be done partially by replacing "unknown" bits with 0s and reconstructed bits by ±1s. A control can be maintained in the receiver during each cross-correlation by monitoring the number of "not reconstructed" bits having a value of "0". If that number is not big, the cross-correlation is performed, but if the reconstructed array is almost empty, this fragment is not used and the receiver will wait for a more favorable moment. Since different phases are compared by sliding and cross-correlating, the cross-correlation peak value depends on the number "unknown" bits at the given stage, which number changes from one sliding position to the next. A kind of scaling may be used to normalize properly, so that the method according to the invention still works normally even with some unkown bits.

The interval for which a signal is reconstructed may be selected in particular such that it can be expected to comprise the last bit edge received before reception of the received beacon signal of which the time of transmission is to be determined.

The accurate time when a received signal was transmitted by a beacon can be computed based on an identification associated to the bits of the reconstructed signal, which enables a determination of the time at which they would have been transmitted by the beacon. Then, only the time difference between the assumed reception of a specific bit of the reconstructed signal and the reception of said received beacon signal is required as further information, in order to determine the accurate time of transmission.

The time of flight of the beacon signal, which is required in addition for determining a relatively accurate time of reception of the beacon signal, can be estimated based on an available position of the beacon at the accurate time of transmission of the received signal and on an inaccurate reference position of the receiver. Such an inaccurate reference position can be provided for instance by a network, and could be e.g. 30 km away from the correct position. The reference position could also be some earlier calculated position of the receiver or any other estimate of the position, which lies up unto 30 km away from the correct position. The resulting time of flight will then be within 1 ms from the correct value. The time of reception determined based on this time of flight lies equally within 1 ms from the correct value.

Advantageously, the received signal is bit-synchronized before the correlation according to the invention is performed, for identifying bit edges. This also enables a correct alignment of samples in each relative position between the received signal and the reconstructed signal.

The cross-correlation can be carried out in a conventional way, or with an approach compensating for residual sinusoidal modulations in the received and tracked beacon signal.

In case the receiver is able to communicate with a network, the receiver may receive various information as basis for the calculations according to the invention. It is to be noted that the receiver can be able to communicate with the network either directly or indirectly, in the case of a mobile communication network for instance via some mobile station. A network may provide a receiver for example with a reference time for the receiver, with a maximum error of this reference time, with a reference position of the receiver and with position information for at least one beacon. The position information can include in particular ephemeris data and/or almanac data for at least one beacon. In an advantageous embodiment of the positioning system according to the invention including a network element of a mobile communication network, the network element comprises therefore means for receiving and tracking signals from at least one beacon, and moreover means for providing the receiver with at least one of the above mentioned pieces of information. As mentioned above, the network providing assistance data can be a mobile communication network, but it can also be any other kind of network which is capable of providing assistance data via a network element, e.g. via a DGPS (Differential Global Positioning system) station.

Each of these data may alternatively be stored in the receiver or be provided by some algorithm in the receiver or a connected processing unit, e.g. another time-recovery algorithm providing an estimate of the current time and the maximum possible error in this estimate. Thus, a receiver according to the invention can also operate independently of assistance data from a network.

Preferably, though not necessarily, the method according to the invention is implemented as software.

The invention can be employed for a fast re-acquisition and for determining the time estimate. By this system, signals of 20 dBHz or below can be acquired. During fast re-acquisition, the time estimate is used to predict the code-phases and Doppler frequencies of other beacons and to narrow the search to fewer candidates.

The beacon can be in particular, though not exclusively, a satellite or a base station of a mobile communication network.

The invention can be employed in particular in the current GPS system, but equally in future extended GPS systems with new signals and in other similar beacon based positioning systems such as Galileo.

Preferably, though not necessarily, the receiver is a GPS receiver and the beacon is a GPS space vehicle.

BRIEF DESCRIPTION OF THE FIGURES

Other objects and features of the present invention will become apparent from the following detailed description of an exemplary embodiment of the invention considered in conjunction with the accompanying drawings, of which.

DETAILED DESCRIPTION OF THE INVENTION

Figure 5:
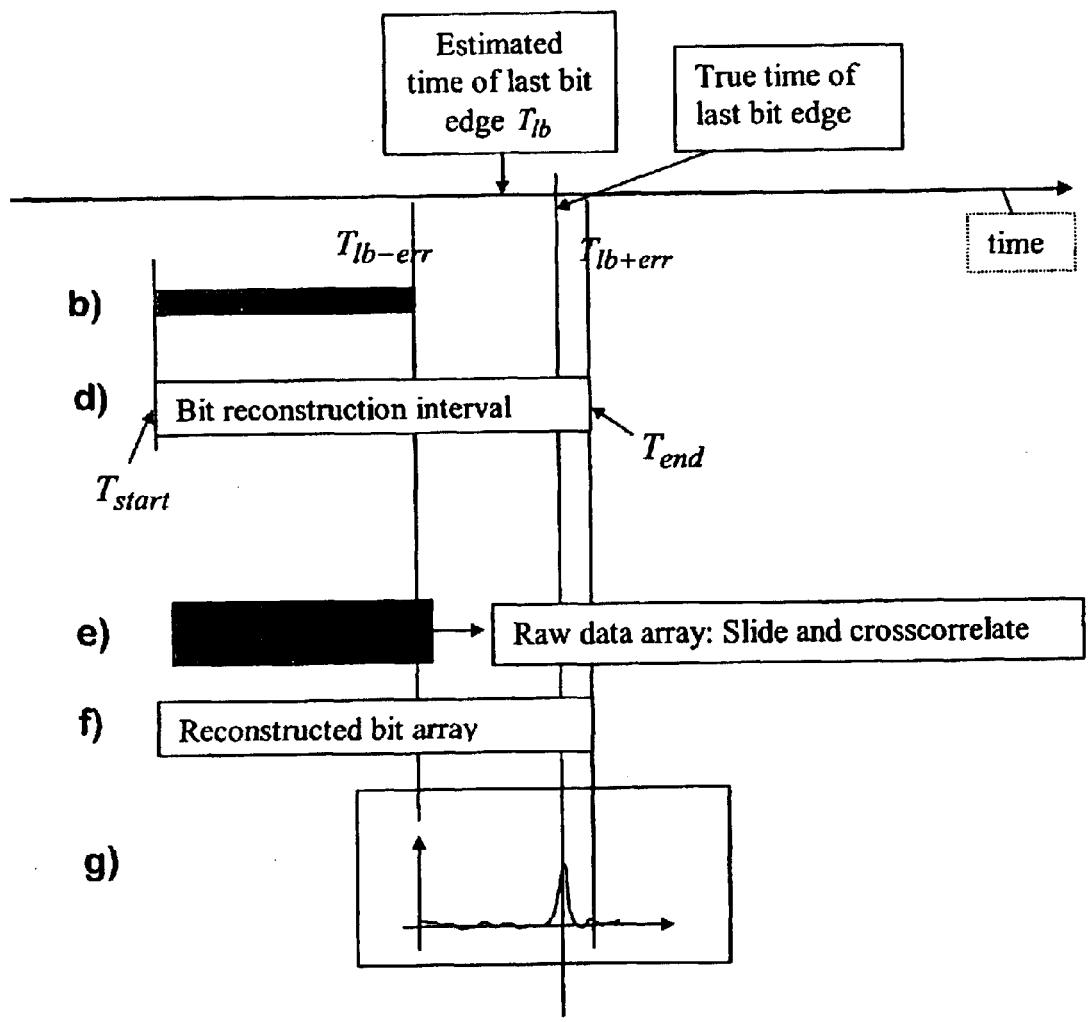
FIG. 5 is a continuation of FIG. 4 and illustrates the cross-correlation of a raw data array with a reconstructed bit array in the method of FIG. 3.
Figure 6:
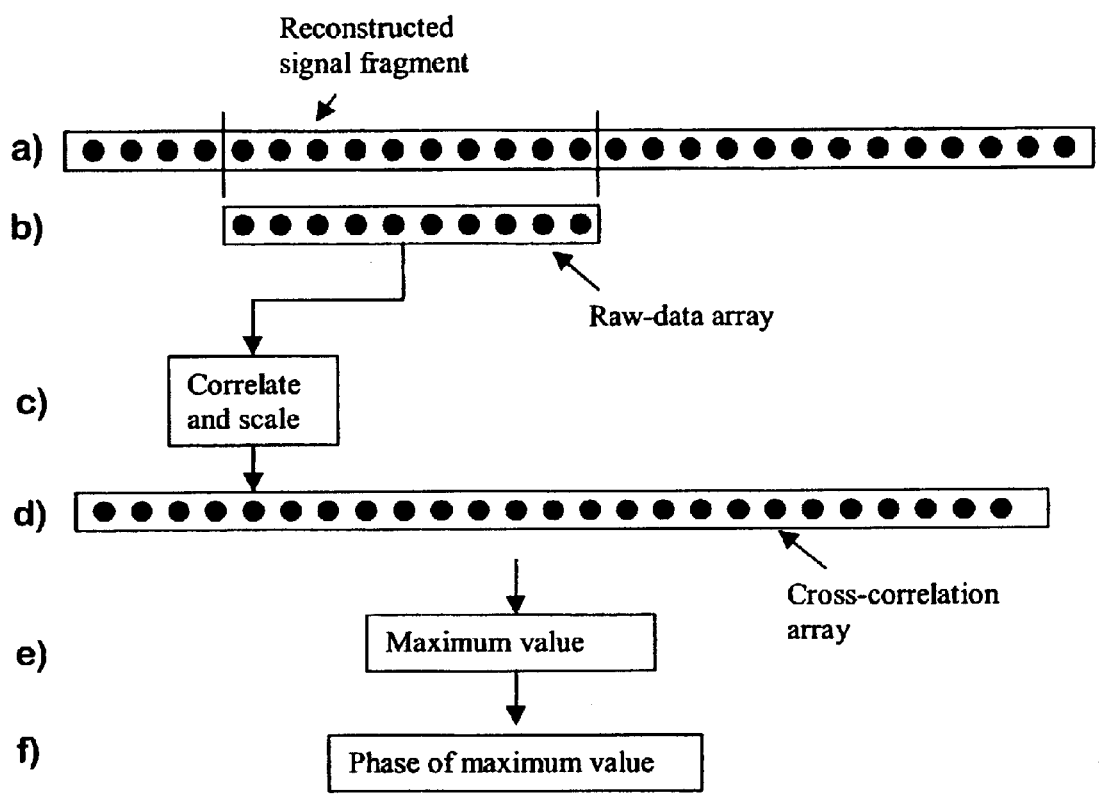
FIG. 6 illustrates the cross-correlation of FIG. 5 in more detail.
Figure 7:
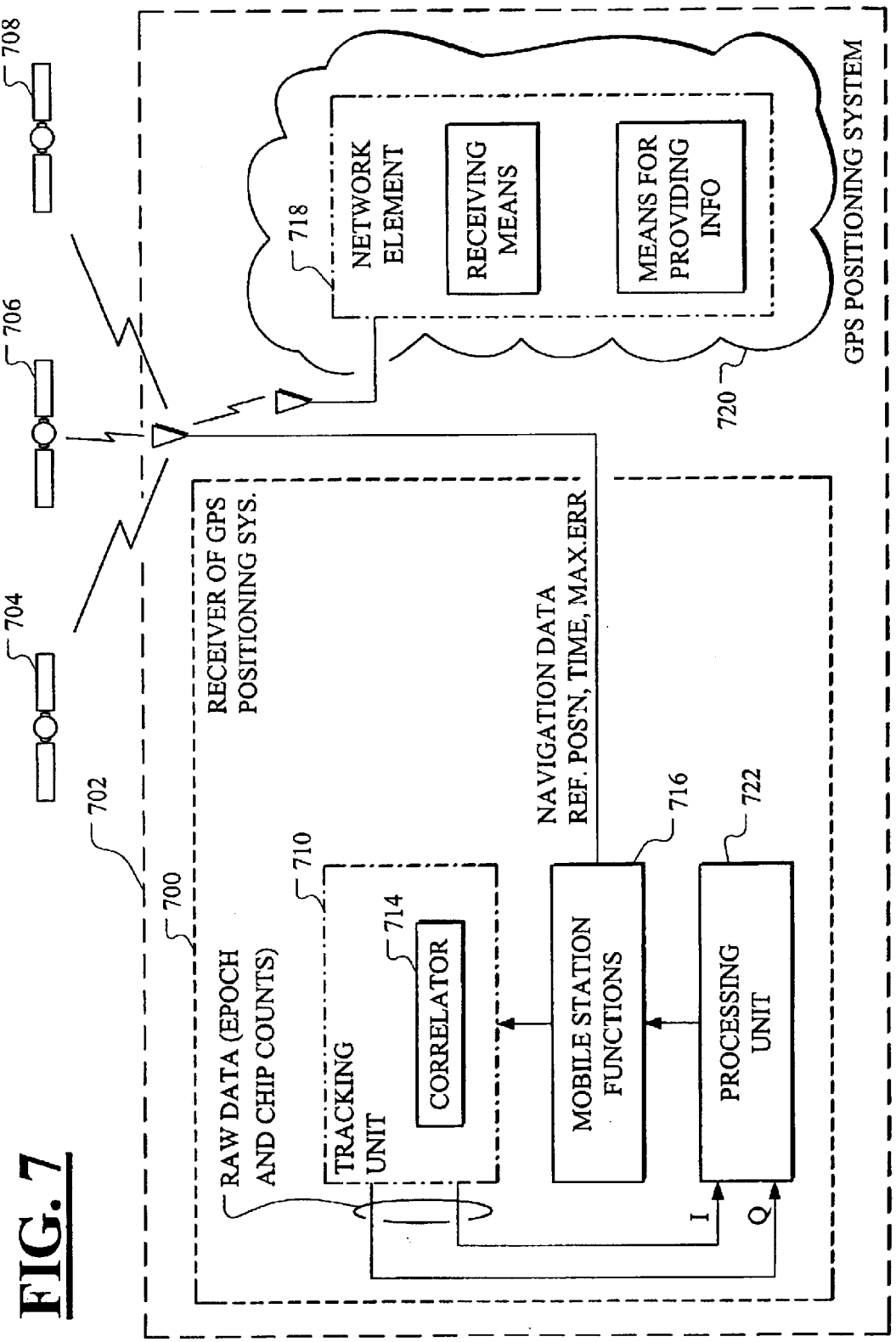
FIG. 7 shows a GPS positioning system, according to the invention.

FIGS. 1 to 6 illustrate an embodiment of a method according to the invention implemented in a receiver 700 as shown in FIG. 7 of a GPS positioning system 702 for enabling a time-recovery of the GPS system time. The GPS receiver receives signals from several GPS satellites 704, 706, 708 and is able to track at least one of the satellites by a tracking loop realized in a tracking unit 710 of the receiver by means of a correlator 714. Further, the GPS receiver comprises the functions of a mobile station 716 and is thus able to receive assistance from a base station 718 of a mobile communication network 720 to which the receiver it is currently connected. The receiver 700 includes a processing unit 722 for carrying out the algorithm shown in FIG. 3.

The time at which the last measurements were received by the GPS receiver are referred to as current time, which current time is the time that is to be determined as accurate GPS time in the proposed time-recovery process.

First, some temporal relations existing for a satellite signal will be described, on which temporal relations the proposed time-recovery is based.

Figure 1:
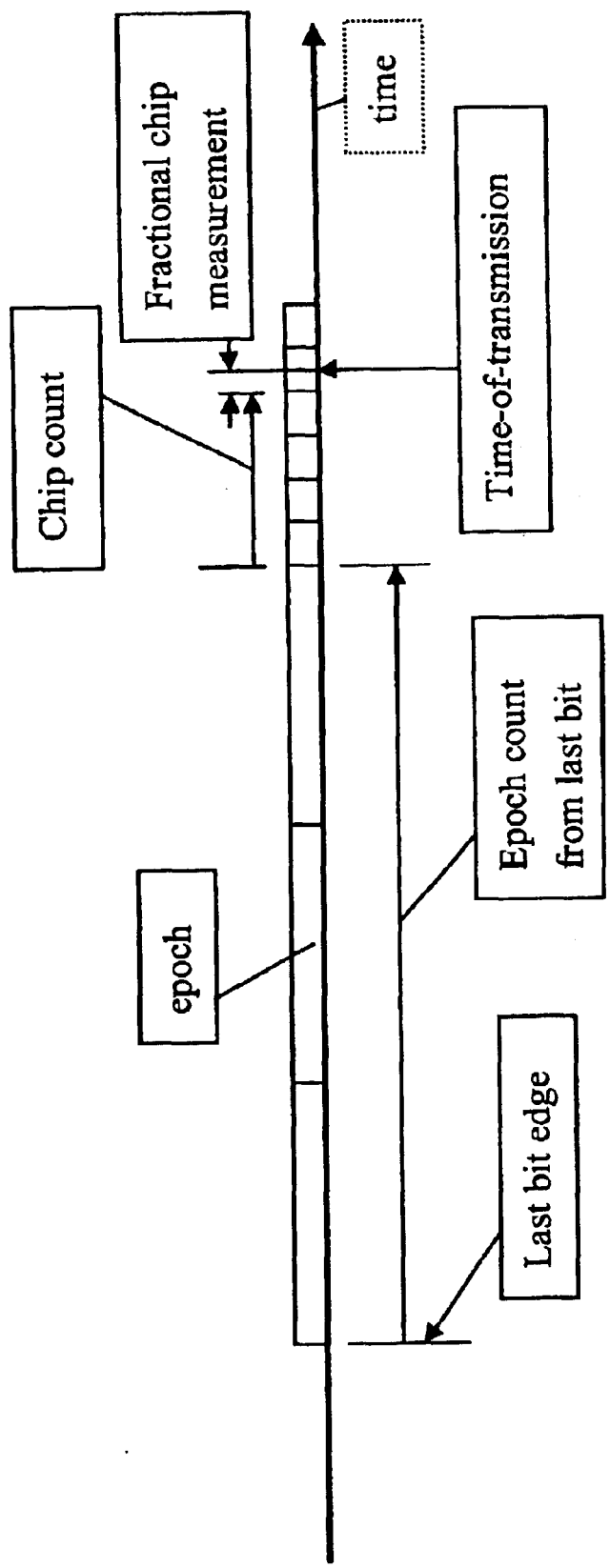
FIG. 1 illustrates the relation between the TOT of a received signal and the preceding last bit edge received in the same channel.

When the receiver tracks a satellite, it is able to count code epochs, each epoch comprising 1023 chips, as well as integer and fractional chips. This is illustrated in FIG. 1 by means of a time bar. On this time bar, the time of transmission of the last bit edge of a previously received signal is indicated. Further indicated on this time bar is the time of transmission of a currently received signal. Whenever the term time of transmission is used in the following without further specification, it always relates to the time of transmission of such a currently received signal. The time of transmission is calculated by subtracting the time of flight TOF, which the signals require to propagate from the satellite to the receiver, from the time of measurement, i.e from the current time. The time of transmission of the last bit edge can be determined in an analogous way.

A bit-synchronization algorithm, which is applied by the tracking unit to tracked signals, provides for the last bit edge a certain epoch counter reading. Moreover the algorithm provides the epoch/chip counter readings for the signal that was just received. Proceeding from the time of transmission of the last bit edge, the receiver counts the epochs until the time of transmission of a newly received signal. In the example of the figure, 3 entire epochs are counted by the receiver between the time of transmission of the last bit edge and the calculated time of transmission of the current signal. The receiver moreover counts the chips between the last entire epoch and the calculated time of transmission of the current signal. In the figure, there are 4 entire chips indicated between the third epoch and the time of transmission of the current signal. Finally, the receiver performs a fractional chip measurement, calculating the time between the last entire chip and the time of transmission of the current signal. Since epochs and chips have a fixed duration at the satellite, the exact time duration from the transmission of the last bit edge until the transmission of the received signal can be determined based on the epoch and chip count.

As becomes apparent from FIG. 1, there is a one-to-one correspondence between the time of the last bit edge and the time when the new signal left the satellite. This means that an error in the time estimate of the time of transmission results in the same error in the estimate of the time of transmission of for the last bit edge. Estimating the time of transmission of the last bit edge accurately would thus allow to recover the accurate time of transmission of the new signal.

Figure 2:
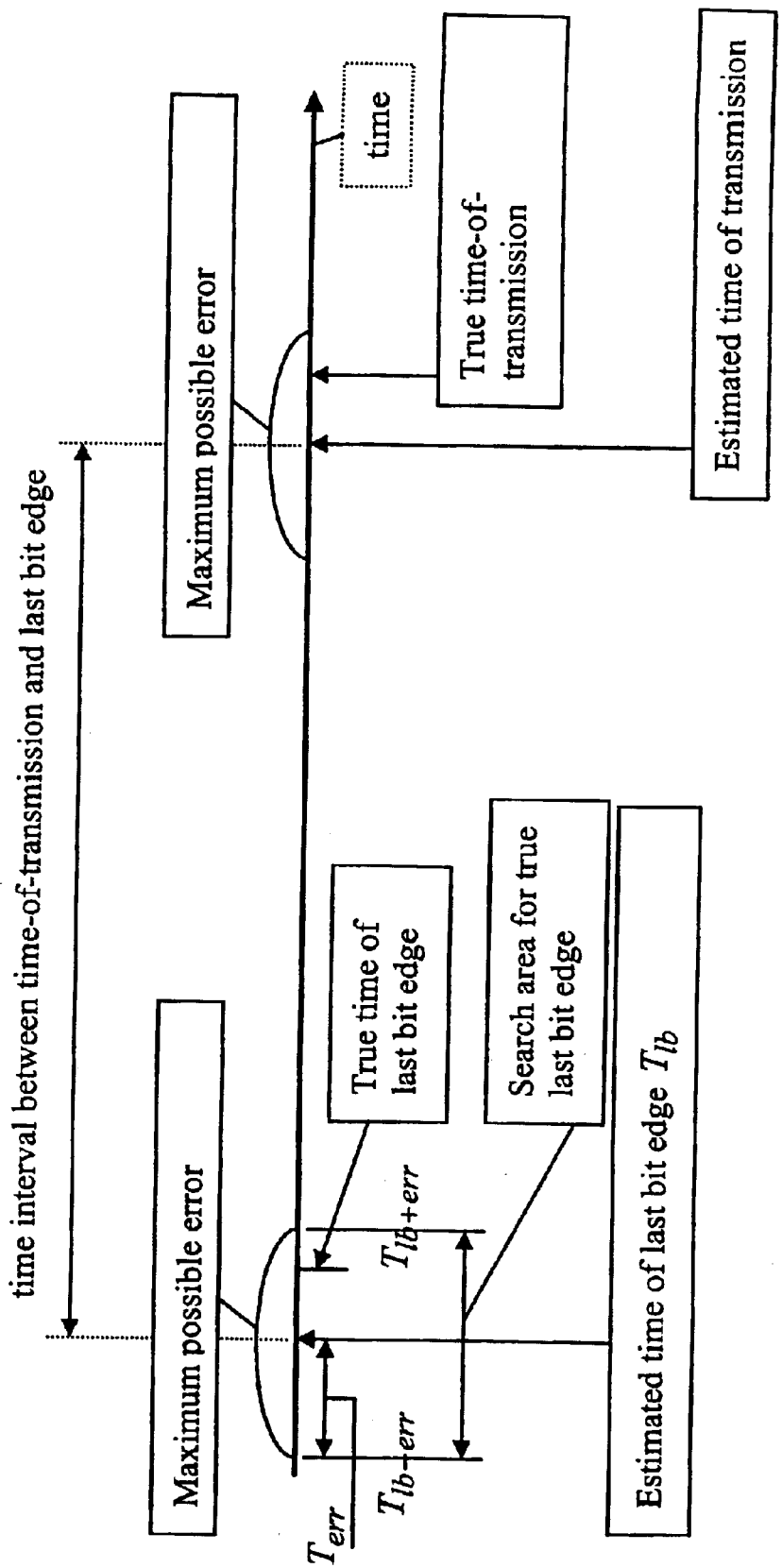
FIG. 2 illustrates the correspondence between the error in an estimated time of transmission and the error in an estimated time of transmission of the preceding last bit edge.

FIG. 2 illustrates by means of another time bar the timing uncertainties that have to be dealt with when determining the accurate time of transmission of the last bit edge.

At the right end of the time bar of FIG. 2, the true time of transmission and an estimated time of transmission of a current signal are indicated. The estimated time of transmission is determined based on an estimate of the current time received from the network and on an assumed TOF. Inaccuracies in the estimated time of transmission thus result from errors in the estimate of the current time and from errors in the TOF estimate. The true time of transmission lies in an interval given by the estimated time of transmission and a known maximum possible error extending in either direction of this estimated time of transmission. The maximum possible error depends on the quality of the reference time. This interval is also indicated in the figure.

At the left end of the time bar of FIG. 2, the true time of transmission of the last bit edge and an estimated time of transmission of the last bit edge $T_{lb}$ are indicated. The estimated time of transmission of the last bit edge $T_{lb}$ is determined based on the estimated time of transmission of the current signal and on the epoch and chip counts from the last bit edge described with reference to FIG. 1. The time interval between the time of transmission of the current signal and of the last bit edge is indicated in the figure by a double headed arrow.

The estimated time of transmission of the last bit edge $T_{lb}$ has the same maximum possible error $T_{err}$ in either direction as the estimated time of transmission of the current signal. The interval of the possible maximum error of the estimated time of transmission of the last bit edge $T_{lb}$ is equally depicted on the time bar, the interval being delimited by a lower limit $T_{lb-err}$ and a higher limit $T_{lb+err}$, wherein $(T_{lb-err}, T_{lb+err}) = (T_{lb} - T_{err}, T_{lb} + T_{err})$. The true time of transmission of the last bit edge lies within this interval, which interval may thus be considered as a search area for the true last bit edge.

The proposed process enabling a time-recovery of the GPS time is based on these considerations and will now be described with reference to the block diagram of FIG. 3, which shows the different steps of the process. The process is realized by a processing unit of the receiver with a corresponding software.

The processing unit receives from the base station, to which the GPS receiver is currently attached, a reference position of the receiver, a reference time, the maximum possible error of the reference time, and navigation data from at least one satellite. Alternatively, such information can be stored and/or generated within the receiver.

The GPS receiver is currently tracking at least this satellite, and the tracking unit provides in addition the raw data from the corresponding tracking channel to the processing unit. The term "raw data" means that no determination on bit values was performed on the outputs of the correlator of the tracking unit on the base band tracking side. The outputs of the correlator comprise I (in-phase) and Q (quadrature) components, which are provided with some accuracy upon a request from the software of the processing unit.

As mentioned above, the tracking unit further applies a bit-synchronization algorithm on the tracked signal. It is expected that a bit-synchronization is achieved in the channel of interest and that thus the bit edges in the signal are known, even though the bits themselves are not easily identifiable due to noise. The bit edges are easier to detect in weak signal conditions, since the bit-synchronization algorithm is an integration type of routine which narrows the noise bandwidth. Thus, the tracking unit can also provide epoch and chip counts to the processing unit.

Figure 3:
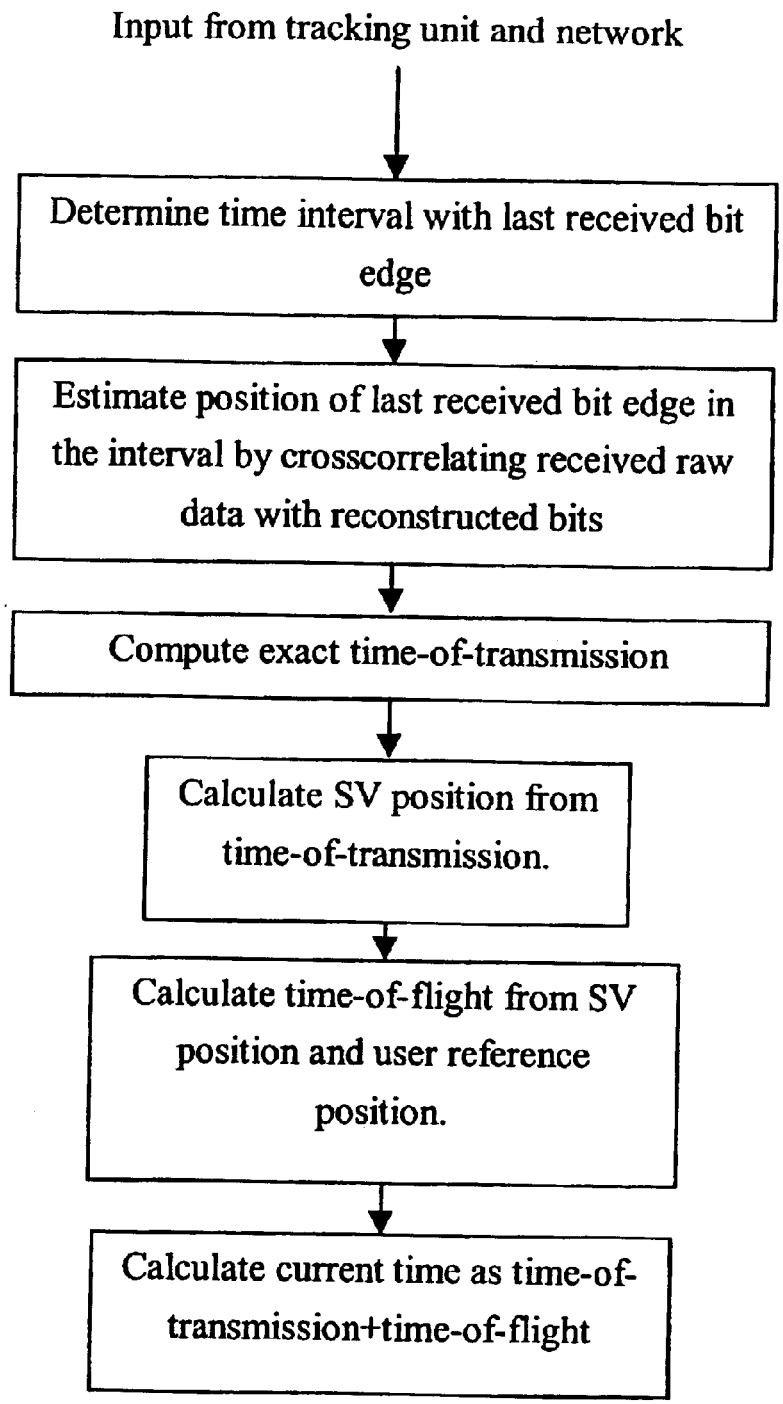
FIG. 3 is a flow chart illustrating an embodiment of the method according to the invention.

In a first step of the process presented in FIG. 3, a time interval is determined which contains the correct GPS time of the transmission of the last received bit edge.

To this end, an estimate of the current time $T_{curr}$ is determined based on the time reference received from the base station. The time uncertainty of the available time estimate, which is equally received from the base station, is denoted again with $T_{err}$. For determining the desired interval, moreover an estimate of the time of flight $T_{TOF}$ is required, unless a nominal default value of 0.078 s is to be used. The time duration corresponding to consecutive raw samples accumulated up to a last bit edge of the received signal is referred to by $T_{raw}$. In other words, $T_{raw}$ is the length of the received beacon signal. The tracking unit of the receiver measures the chip and epoch counts from the last bit edge as described with reference to FIG. 1 and provides them to the processing unit. The entire time equivalent of the counted epochs, chips and fractional chip measurements from last bit edge to the estimated time of transmission of the received signal is denoted as $T_{FromLastBit}$. The time of transmission of the last bit edge from the satellite is then expected to lie in the interval:

$$(T_{lb-err}, T_{lb+err}) \equiv (T_{curr} - T_{TOF} - T_{FromLastBit} - T_{err}, T_{curr} - T_{TOF} - T_{FromLastBit} + T_{err})$$

wherein $T_{curr}$ is an estimated time of arrival of said received beacon signal, wherein $T_{TOF}$ is an estimated time of flight of said received beacon signal, wherein $T_{FromLastBit}$ is a determined time between an estimated time of transmission of said last bit edge and an estimated time of transmission of said received beacon signal, wherein $T_{err}$ is a total time uncertainty of the available time estimates $T_{curr}$ and $T_{TOF}$.

In a second step, which is also indicated in FIG. 3, the time of transmission of the last received bit edge is estimated more precisely. This further estimation is based on cross-correlating the received raw data array with a reconstructed bit array. The determination of the bit reconstruction interval required to this end is illustrated in FIG. 4.

Figure 4:
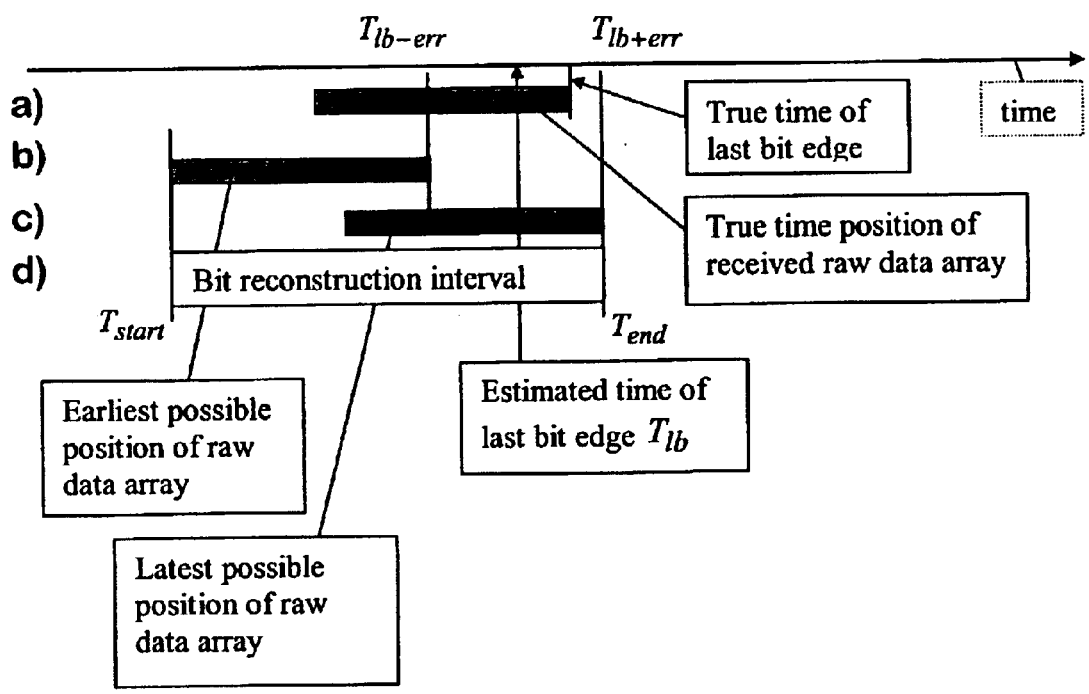
FIG. 4 illustrates the determination of a bit reconstruction time interval in the method of FIG. 3.

FIG. 4 shows another time bar. As in FIG. 2, the estimated time of transmission of the last bit edge $T_{lb}$, the true time of transmission of the last bit edge, and the boundaries $T_{lb-err}$, $T_{lb-err}$ for the maximum possible error in the estimated time of transmission of the last bit edge $T_{lb}$ are depicted. A first horizontal beam a) further illustrates that the true time position of the received raw data with the duration $T_{raw}$ ends exactly with the true time of transmission of the last bit edge, when the raw data is shifted back in time according to the known regularities of the GPS signal. A second horizontal beam b) illustrates the earliest possible position of the raw data array and a third horizontal beam c) the latest possible position of the raw data array, when assuming that the unknown last bit edge time lies within the above defined interval ($T_{lb-err}$, $T_{lb+err}$).

When determining the bit reconstruction interval for which bits have to be reconstructed from available navigation data for the cross-correlation, it has to be ensured that reconstructed bits are available for correlations with the raw data proceeding from the depicted earliest possible position to the depicted latest possible position. This means that reconstructed bits have to be provided beginning at a time of the duration $T_{raw}$ of the raw data before the earliest possible bit edge time $T_{lb-err}$, and ending with the latest possible last bit edge time $T_{lb+err}$.

The bit reconstruction interval, which is shown as fourth horizontal beam d) in FIG. 4, can thus be calculated to:

$$(T_{start}, T_{end}) \equiv (T_{lb-err} - T_{raw}, T_{lb+err}).$$

In a next step, a navigation data reconstruction routine of a frame-reconstructor of the processing unit is called. The routine reconstructs the navigation data bits using the satellite parameters received from the network. The navigation bits are reconstructed for the entire determined time interval ($T_{start}, T_{end}$). Each bit in the reconstructed array of bits can be identified by its address in the navigation message, i.e. by the frame number, by the subframe number and by the bit index in that subframe.

FIG. 5 is a continuation of FIG. 4 and shows again the true time of transmission of the last bit edge, the estimated time of transmission of the last bit edge $T_{lb}$, the limits for the maximal possible error of the estimated time $T_{lb-err}$ and $T_{lb+err}$, a horizontal beam b) indicating the earliest possible position of the raw data array and a horizontal beam d) representing the bit reconstruction interval. In addition, the reconstructed bit array is depicted in FIG. 5 as horizontal beam f).

In a third step of the process illustrated by the flow chart of FIG. 3, a cross-correlation is performed between the raw data array, represented in FIG. 5 by a horizontal beam e), and the reconstructed bit array of beam f), in order to find the best match between the raw data and a specific fragment of the reconstructed bit array.

The accumulated data in the raw data array of beam e) is compared to different fragments of the reconstructed bit array of beam f), which fragments have the same duration $T_{raw}$ as the raw data array, by shifting the raw data array along the reconstructed bit array and cross-correlating overlapping sections at each shifting position. The results of the cross-correlations at each shifting position are collected in an array. A diagram g) presenting an exemplary distribution of the values in such an array is shown in FIG. 5, the values being associated to the last bit in the respective fragment of the reconstructed bit array employed in a correlation on the time bar. From this array, the maximum absolute value is selected and the corresponding shifting position determined. The fragment of the reconstructed data array associated to this shifting position is expected to constitute the best match for the raw data array. In FIG. 5, the diagram shows accordingly a clear maximum at the true time of transmission of the last bit edge.

The last received bit of the raw data array can thus be associated to the last bit in the determined fragment of the reconstructed array. Since the bit addresses of all reconstructed bits in the reconstruction interval are known, also the last bit of the determined fragment can be clearly identified. The identification of the last bit in a subframe/bit-in-subframe format allows to find the exact GPS time of the transmission of the last bit edge.

In a further step of the process of FIG. 3, the time when the received signal left the satellite is computed as accurate time of transmission $T_{TOT}$. The reconstructed bit addresses are known with the known SubframeNumber and LastBitNumber, which enable to determine a first component of the accurate time of transmission. The processing unit further received from the tracking unit the epoch count at the estimated last bit edge LastBitEpochCount as well as the current epoch count CurrentEpochCount, i.e. the epoch count at the time of reception of the received signal, and equally sub-millisecond chip count measurements in seconds, which is denoted as C/A and enables to determine a second component of the accurate time of transmission. The entire accurate time of transmission $T_{TOT}$ can be computed as:

$T_{TOT} = SubframeNumber * 6s + LastBitNumber * 20ms +$ $(CurrentEpochCount - LastBitEpochCount) * 1ms +$ $(IntegerChipCountInSeconds + FractionalChipCountInSeconds)$ In a last step of the process of FIG. 3, the current time estimate is refined at the receiver.

To this end, the position of the satellite is now calculated from the determined accurate time of transmission and from ephemeris data received from the base station for this satellite. Then, the exact time of flight TOF is calculated based on the reference position of the user provided by the base station and on the determined position of the satellite. The current time is estimated as the sum of the accurate time of transmission and the determined time of flight.

FIG. 6 finally illustrates in more detail a possible cross-correlation technique for the above described method.

In a first row a) of FIG. 6, an array with reconstructed bits is depicted. The array corresponds to the array represented in FIG. 5 by beam f). The replica is sampled with one sample per bit in the current example, each bit being represented in the array by a black circle.

In a second row b), an array of raw data from a tracking channel is shown. The raw data has a known number of samples per bit, each bit being represented in the array by a black circle. This array corresponds to the array represented in FIG. 5 by beam e). The satellite signal has two components I and Q, and each raw data sample is interpreted as a complex number with I and Q representing the real and imaginary parts appropriately.

The raw data array of row b) slides along the reconstructed signal of row a), and the processing unit tries to find a similar bit pattern in the replica. In the current sliding position, the array of raw data is aligned with a fragment of the reconstructed signal which is delimited in row a) by two vertical lines.

For each shifting position, the overlapping part of the received signal and the reconstructed signal are multiplied elementwise, and the results are additively combined as will be described in the following.

As mentioned above, the signal from tracking channels has two components I and Q. Each raw data sample is interpreted as a complex number with I and Q representing the real and imaginary parts appropriately. The reconstructed bits are either 1 or −1, if they are known, otherwise they are 0. The reconstructed bits will now be denoted by $X_r(n)$, where n=0,1, . . . , N−1. N is the number of reconstructed bits, assuming that the number of samples per reconstructed bit is one. The raw data will be denoted by $X_s(k)=I(k)+jQ(k)$, where k=0,1, . . . , K−1. K is the number of samples of the raw data, and the number of samples per bit in the raw data will be denoted by $k_{s/b}$, with a default value of e.g. 4. Taking into account that each bit in the reconstructed array thus corresponds to $k_{s/b}$ samples in the raw-data array, the conventional cross-correlation R (1) for a specific alignment position 1 is then determined by:

$$R(l) = \sum_{k=0}^{K-1} X_r(l + \lfloor k/k_{s/b} \rfloor) X_s(k), l = 0, 1, \ldots, N - \lfloor K/k_{s/b} \rfloor$$

This operation is represented in FIG. 6 by row c).

The resulting values R(1) for all alignment positions are inserted at a corresponding position into an array shown in row d) of FIG. 6.

When the correlation value for all alignment positions is provided, the maximum value is determined, as indicated in row e) of FIG. 6.

Finally, the phase of the alignment position corresponding to this maximum correlation value is determined, as indicated in row f) of FIG. 6, in order to compute the time of transmission of the signal resulting in the raw data, as described above with reference to FIG. 3.

Alternatively, a cross-correlation could be employed which compensates for residual sinusoidal modulations in the raw data, in particular for a Doppler frequency. To this end, instead of performing a cross-correlation directly on the respective overlapping parts of the received signal and the reconstructed signal, a modified cross-correlation algorithm is applied.

In a first step, this algorithm splits the array with the respective fragment of the reconstructed signal and the array with the raw data into sections of equal size. The correlation for each alignment position is then computed by the algorithm based on four steps.

In a first step, a pointwise multiplication of the samples of the reconstructed signal and the raw data is performed, as for a conventional cross-correlation. In a second step, however, the results are integrated separately for each section in a coherent integration.

In a third step, the results of these subcorrelations are multiplied with a shifted, conjugated version of themselves. In a final fourth step, the results of these second multiplications are integrated in a non-coherent integration. Thereby, residual sinusoidal modulations in the raw data are reduced.

The resulting value for the current alignment position is inserted at a corresponding position in an array, as the array indicated in row d) of FIG. 6, and is further treated as described with reference to FIG. 6.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for determining in a positioning system a time of reception of a received beacon signal transmitted by a beacon and received by a receiver receiving and tracking signals at least from this beacon, wherein signals from said beacon have a component of a known regularity, said method comprising:

a) reconstructing a beacon signal for an interval ($T_{start}$, $T_{end}$) based on available information on signals from said beacon valid for said interval;

b) performing a cross-correlation between overlapping parts of said reconstructed beacon signal and said received beacon signal at different relative positions to each other;

c) determining a time of transmission of said received beacon signal based on information for said reconstructed signal and on a relative position resulting in a maximum correlation value between said reconstructed beacon signal and said received beacon signal; and d) determining the time of reception of said received beacon signal as a sum of said determined time of transmission ($T_{TOT}$) of said received beacon signal and of a calculated time of flight ($T_{TOF}$) of said received beacon signal.

2. Method according to claim 1, wherein reconstructing said reconstructed beacon signal in said interval comprises:

computing a time interval ($T_{start}$, $T_{end}$) containing a time of transmission of a last bit edge preceding the transmission of said received beacon signal in a channel of said received beacon signal as ($T_{start}$, $T_{end}$)=($T_{curr}$−$T_{TOF}$−$T_{FromLastBit}$−$T_{err}$−$T_{raw}$, $T_{curr}$−$T_{TOF}$−$T_{FromLastBit}$+$T_{err}$), wherein $T_{curr}$ is an estimated time of arrival of said received beacon signal, wherein $T_{TOF}$ is an estimated time of flight of said received beacon signal, wherein $T_{FromLastBit}$ is a determined time between an estimated time of transmission of said last bit edge and an estimated time of transmission of said received beacon signal, wherein $T_{err}$ is a total time uncertainty of available time estimates $T_{curr}$ and $T_{TOF}$, and wherein $T_{raw}$ is a length of the received beacon signal; and reconstructing said reconstructed beacon signal for said determined time interval ($T_{start}$, $T_{end}$).

3. Method according to claim 1, wherein said time of transmission of said received beacon signal is determined based on a bit address associated to a last bit of a fragment of said received beacon signal presenting a highest correlation value in said cross-correlation with said reconstructed beacon signal, and on a time difference between transmission of said last bit edge and the transmission of said received beacon signal, which time difference is determined based on epoch, chip and fractional chip measurements on a channel on which said received beacon signal is received.

4. Method according to claim 2, wherein said time of flight is determined based on an available position of said beacon at an accurate time of transmission of said received beacon signal and on an available coarse reference position of said receiver.

5. Method according to claim 1, wherein said cross-correlation takes into account a possible difference in sampling rate in said received beacon signal and said reconstructed beacon signal.

6. Method according to claim 1, wherein a bit-synchronization is achieved for said received beacon signal before performing said cross-correlation.

7. Method according to claim 1, wherein a network provides at least one of the following pieces of information for said method: a reference time for the receiver, a maximum error of a reference time, a reference position of the receiver and position information for at least one beacon.

8. Method according to claim 1, wherein said beacon is a satellite.

9. Method according to claim 8, wherein said receiver is a GPS receiver and wherein said satellite is a GPS space vehicle.

10. Method according to claim 1, wherein said beacon is a base station of a communication network.

11. Receiver comprising means for receiving and tracking signals from at least one beacon and processing means for realizing the steps of the method according to claim 1.

12. Positioning system comprising a receiver and at least one network element of a network, said receiver including means for communicating with said network, receiving means for receiving and tracking signals from at least one beacon and processing means for realizing the steps of the method according to claim 1.

13. Positioning system according to claim 12, wherein said network element includes receiving means for receiving and tracking signals from said at least one beacon and means for providing said receiver with at least one of the following information: a reference time for said receiver, a maximum error of a reference time, a reference position of said receiver and position information for said beacon.

14. Positioning system according to claim 12, wherein said network is a mobile communication network.

15. Positioning system comprising a receiver and a processing unit external to said receiver, said receiver including receiving means for receiving and tracking signals from at least one beacon and means for providing received and tracked beacon signals to said processing unit, and said processing unit comprising means for realizing the steps of the method according to claim 1.

16. Positioning system according to claim 15, further comprising at least one network element of a network, wherein said processing unit comprises means for communicating with said network element, and wherein said network element includes receiving means for receiving and tracking signals from said beacon and means for providing said processing unit with at least one of the following pieces of information: a reference time for said receiver, a maximum error of a reference time, a reference position of said receiver and position information for said beacon.

17. Positioning system according to claim 16, wherein said network is a mobile communication network.

\* \* \* \* \*

UNITED STATES PATENT AND TRADEMARK OFFICE
CERTIFICATE OF CORRECTION

PATENT NO. : 6,833,813 B2
DATED : December 21, 2004
INVENTOR(S) : Akopian et al.

It is certified that error appears in the above-identified patent and that said Letters Patent is hereby corrected as shown below:

Title page,
Item [56], References Cited, FOREIGN PATENT DOCUMENTS,
please cancel "7/2000" and substitute -- 7/2001 -- therefor.

Signed and Sealed this

Fifth Day of July, 2005

JON W. DUDAS
*Director of the United States Patent and Trademark Office*